(12) United States Patent
Oh (10) Patent No.: US 12,192,613 B2
(45) Date of Patent: Jan. 7, 2025

(54) ADVANCED INDICATOR SYSTEM WITH COLORFUL E-INK LAYER FOR EMBEDDED CAMERA DISPLAY

(71) Applicant: Dell Products L.P., Round Rock, TX (US)

(72) Inventor: Guentaek Oh, Hillview (SG)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 17/748,590

(22) Filed: May 19, 2022

(65) Prior Publication Data
US 2023/0379569 A1 Nov. 23, 2023

(51) Int. Cl.
*H04N 23/63* (2023.01)
*G02F 1/13357* (2006.01)
*G02F 1/167* (2019.01)
*G02F 1/1685* (2019.01)

(52) U.S. Cl.
CPC ..... *H04N 23/631* (2023.01); *G02F 1/133621* (2013.01); *G02F 1/167* (2013.01); *G02F 1/1685* (2019.01)

(58) Field of Classification Search
CPC .......... H04N 23/631; G02F 1/1685; G02F 1/133621; G02F 1/167
See application file for complete search history.

(56) References Cited

U.S. PATENT DOCUMENTS

| | | | |
|---|---|---|---|
| 1,194,216 A * | 8/1916 | Morse | A63H 5/00 446/419 |
| 7,140,550 B2 | 11/2006 | Ramachandran | |
| 7,353,988 B1 | 4/2008 | Ramachandran | |
| 11,269,233 B2 * | 3/2022 | You | G02B 26/005 |
| 11,397,452 B2 * | 7/2022 | Hsieh | G06F 1/1605 |
| 11,726,380 B1 * | 8/2023 | Oh | G03B 11/045 349/103 |
| 11,887,551 B1 * | 1/2024 | Ringuette | G03B 9/58 |
| 2002/0135860 A1 * | 9/2002 | Iwanaga | G02F 1/13725 359/296 |
| 2003/0011560 A1 * | 1/2003 | Albert | G02F 1/167 345/107 |
| 2004/0027642 A1 * | 2/2004 | Ahn | G02F 1/16757 359/296 |
| 2005/0099559 A1 * | 5/2005 | Lee | G02F 1/133514 349/113 |
| 2005/0140576 A1 * | 6/2005 | Sawada | G09G 3/3611 345/30 |
| 2021/0074780 A1 * | 3/2021 | Woo | H10K 59/65 |

\* cited by examiner

*Primary Examiner* — Ariel A Balaoing
(74) *Attorney, Agent, or Firm* — Larson Newman, LLP (57) ABSTRACT

An LCD panel includes a thin-film transistor layer having a first portion to provide an image on the LCD panel, and a second portion. An electronic ink reservoir is located proximate to the second portion of the thin-film transistor layer and includes an electronic ink configured under a first electrical stimulus to present a first color and under a second electrical stimulus to present a second color. The LCD panel directs the second portion of the thin-film transistor layer to provide the first electrical stimulus to the electronic ink reservoir in response to the LCD panel being in a first state, and directs the second portion of the thin-film transistor layer to provide the second electrical stimulus to the electronic ink reservoir in response to the LCD panel being in a second state.

16 Claims, 6 Drawing Sheets

ADVANCED INDICATOR SYSTEM WITH COLORFUL E-INK LAYER FOR EMBEDDED CAMERA DISPLAY

FIELD OF THE DISCLOSURE

This disclosure generally relates to information handling systems, and more particularly relates to providing an indicator system with a colorful e-ink layer for an embedded camera in a display device of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An LCD panel may include a thin-film transistor layer and an electronic ink reservoir. The thin-film transistor layer may include a first portion to provide an image on the LCD panel, and a second portion. The electronic ink reservoir may be located proximate to the second portion of the thin-film transistor layer and may include an electronic ink configured under a first electrical stimulus to present a first color and under a second electrical stimulus to present a second color. The LCD panel may direct the second portion of the thin-film transistor layer to provide the first electrical stimulus to the electronic ink reservoir in response to the LCD panel being in a first state, and may direct the second portion of the thin-film transistor layer to provide the second electrical stimulus to the electronic ink reservoir in response to the LCD panel being in a second state.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
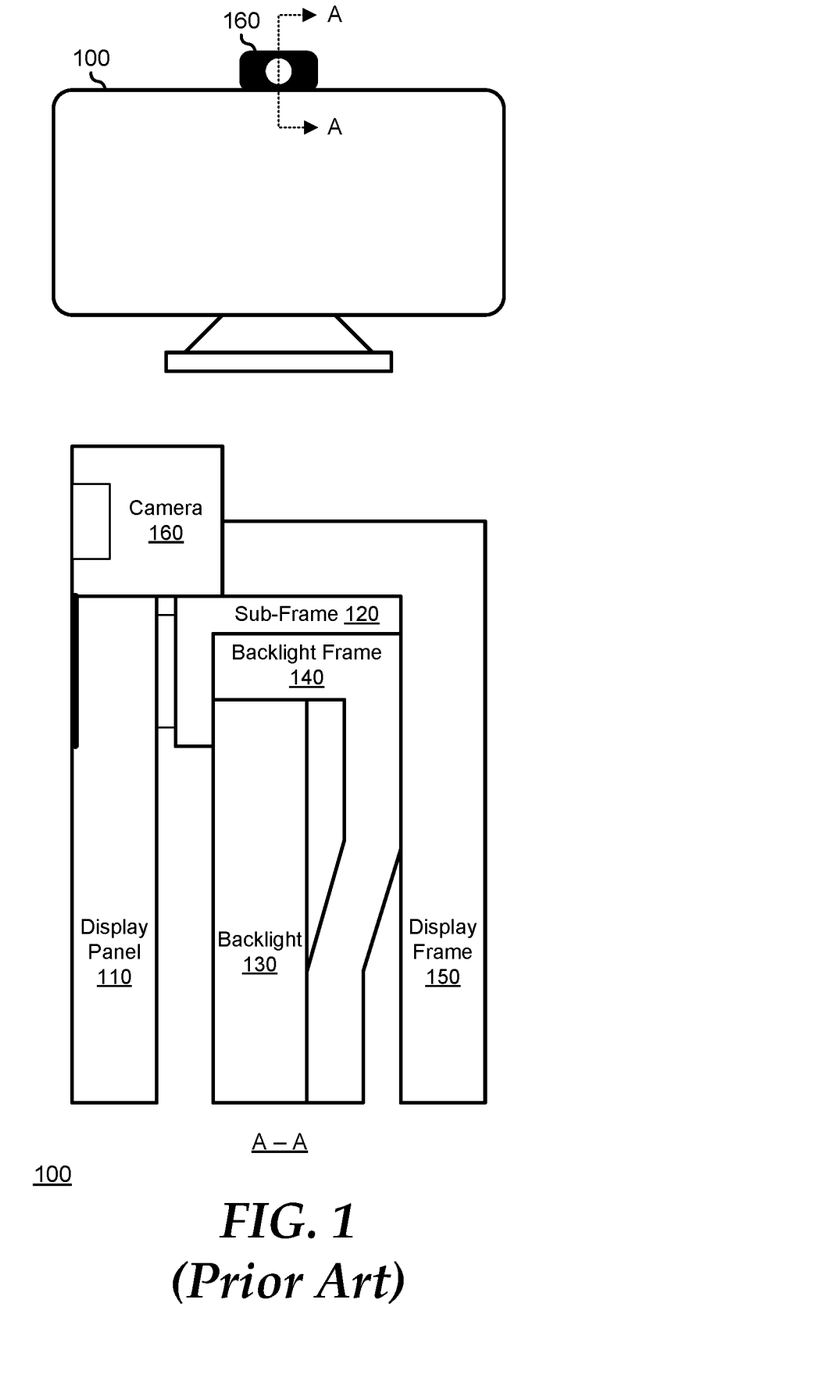
FIG. 1 is a cut-away diagram of a display according to the prior art.

FIG. 1 illustrates a display 100 and a cut-away view A-A of the display, as may be known in the prior art. Display 100 represents a device for projecting visual information, and may include a computer monitor, an outdoor display, a laptop or tablet display screen, a cellular phone device display screen, or other display, as needed or desired. Note that, as illustrated, display 100 is represented as a Liquid Crystal Display (LCD) display device, but this is not necessarily so. In particular, display 100 may also represent a Light Emitting Diode (LED) display such as an Organic LED (OLED) display, a Plasma Display Panel (PDP) display, a Quantum Dot LED (QLED) display, or the like.

Display 100 includes a display panel 110, a panel subframe 120, a backlight assembly 130, a backlight frame 140, a display frame 150, and a camera/video device 160. Display panel 110 represents a Liquid Crystal Display (LCD) device and typically includes a top polarizer film, a display panel device, and a bottom polarizer film. The top polarizer film typically includes a printed portion on a bottom surface of the top polarizer film, that is, on a surface adjacent to the display panel device. The printed portion is a darkened portion of the top polarizer film that provides a distinct edge for display panel 110. Display panel 110 may be provided by a display manufacturer as an assembled unit, or the display panel and polarizer films may be provided separately, and assembled into the display panel assembly by a manufacturer of display 100, as needed or desired. The details of display panel assembly, both in terms of its manufacture and use in projecting visual information are known in the art, and will not be further described herein, except as needed to illustrate the current embodiments.

Display panel 110 is affixed to panel subframe 120 by a strip of double-sided tape around the perimeter of the display panel, and that adheres the bottom edge of the display panel to the panel subframe. Backlight assembly 130 provides the light source for display panel 110, and is affixed to backlight frame 140, and may further provide a mounting assembly for affixing panel subframe 120 to the backlight frame. Display frame 150 provides a rigid mounting structure for the assemblage of display panel 110, panel subframe 120, backlight assembly 130, and backlight frame 140. Camera/video device 160 represents a device that is configured to gather visual information from a field of view in front of display 100. As illustrated, camera/video device 160 is housed in a portion of display 100 that extends above a top limit of display panel 110. In a particular embodiment, display frame 150 extends around camera/ video device 160 to provide a housing for the camera/video device. Display 100 may include a protective cover, as needed or desired.

Display 100 is characterized as having a particular bezel width, that is, an area at the edge of the display that is not usable for the projection of visual information. The bezel width is the width between the outer edge of display frame 150 and the inner edge of the printed portion on the top polarizer film. Design trends for displays such as display 100 are focused on minimizing the bezel width in order to be able to mount multiple displays together and provide a seamless visual display across the multiple displays. In this regard, a monitor or other type of display similar to display 100 is not amenable to the stacking of multiple monitors or display type devices into a larger image projecting system, because, to the extent that camera/video device 160 protrudes above the extent of the display panel, the effective width of the bezel of display 100 is increased on the top side of the display. As such, any horizontal gaps between stacked monitors or display type devices is increased, leading to an undesirable visual artifact in the image projected by the larger image projecting system.

In other embodiments, a display may include a camera/video device that "pops-up" from the display frame when needed, and that recedes back into the display frame when not is use. While such a display resolves the issue of the wider bezel of display 100, the use of a pop-up camera/video device results in a thicker display which may not be suitable for compact use cases such as laptop computers, tablet devices, smart phone devices, and the like. Moreover, a pop-up camera/video device is more mechanically complex, and hence more costly to produce, and introduces an unnecessary point of failure in the pop-up mechanism.

Figure 2:
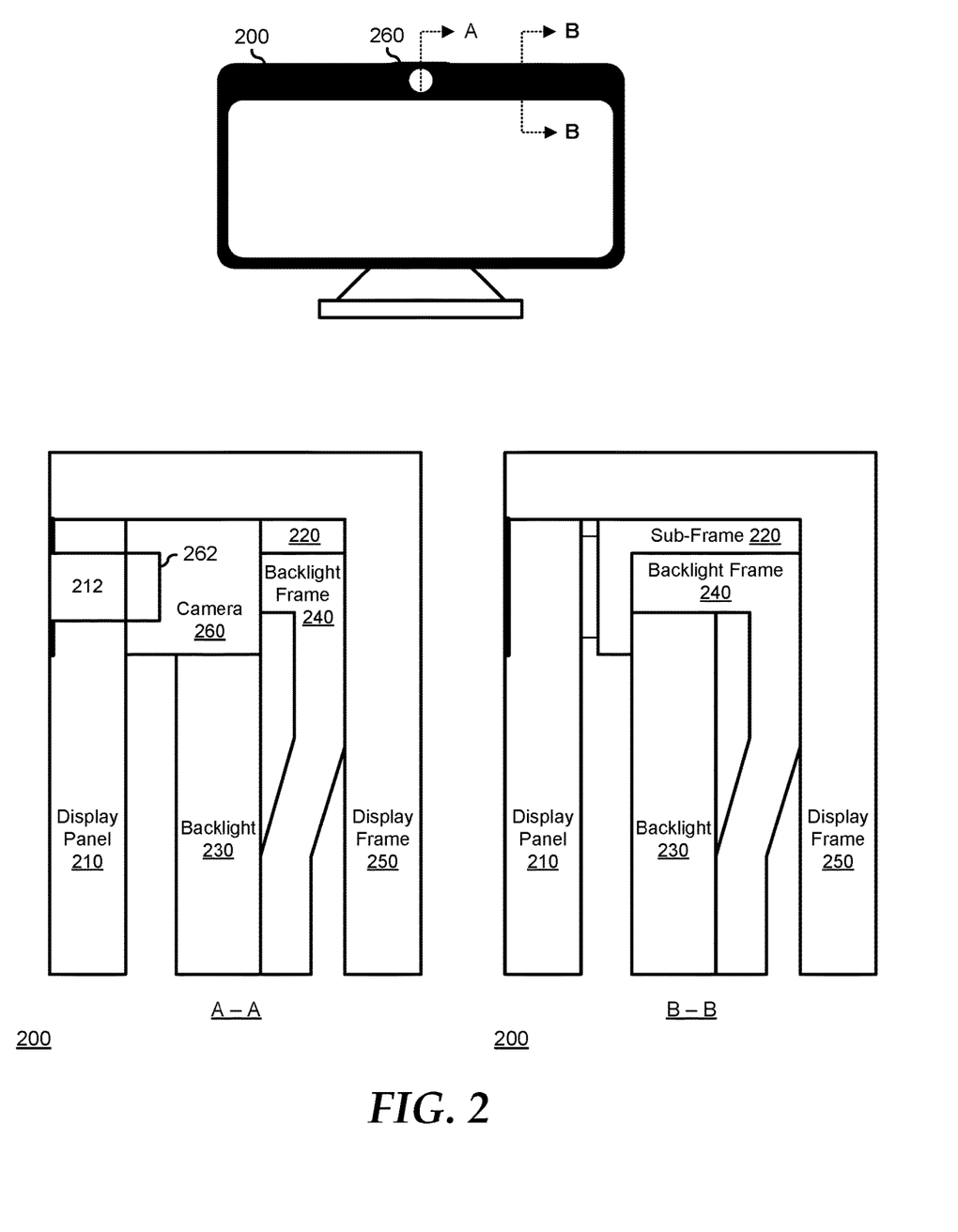
FIG. 2 is a first cut-away diagram and a second cut-away diagram of a display according to an embodiment of the current disclosure.

FIG. 2 illustrates a display 200 and cut-away portions A-A and B-B of the display, according to an embodiment of the current disclosure. Display 200 is similar to display 100, representing a device for projecting visual information, and may include a computer monitor, an outdoor display, a laptop or tablet display screen, a cellular phone device display screen, or other display, as needed or desired. Display 200 may represent a LCE display, a LED display, a PDP display, a QLED display, or the like, and the teachings of the present disclosure will be understood by the skilled artisan to be broadly adaptable to various display technologies, as needed or desired.

Display 200 includes a display panel 210, a backlight assembly 230, a backlight frame 240, a display frame 250, and a camera/video device 260. Unless otherwise noted the elements of display 200 are similar to the associated elements of display 100 (i.e., display panel 210 is similar to display panel 110, etc.). In cut-away portions A-A and B-B, display 200 is revealed to have the narrow bezel associated with displays with no camera/video device. Hence display 200 may be understood to be amendable to stacking of multiple similar displays to form a larger image projecting system, without suffering from the enlarged horizontal gap as may result from the stacking of displays like display 100. This may be understood in the illustration of cut-away portion A-A, where camera/video device 260 is shown as being located behind display panel 210, and wholly within the confines of display frame 150. It will be understood that camera/video device 160 may be affixed within display 100 by attachment to sub-frame 220, to backlight frame 240, to display frame 150, or to a combination thereof, as needed or desired.

Figure 3:
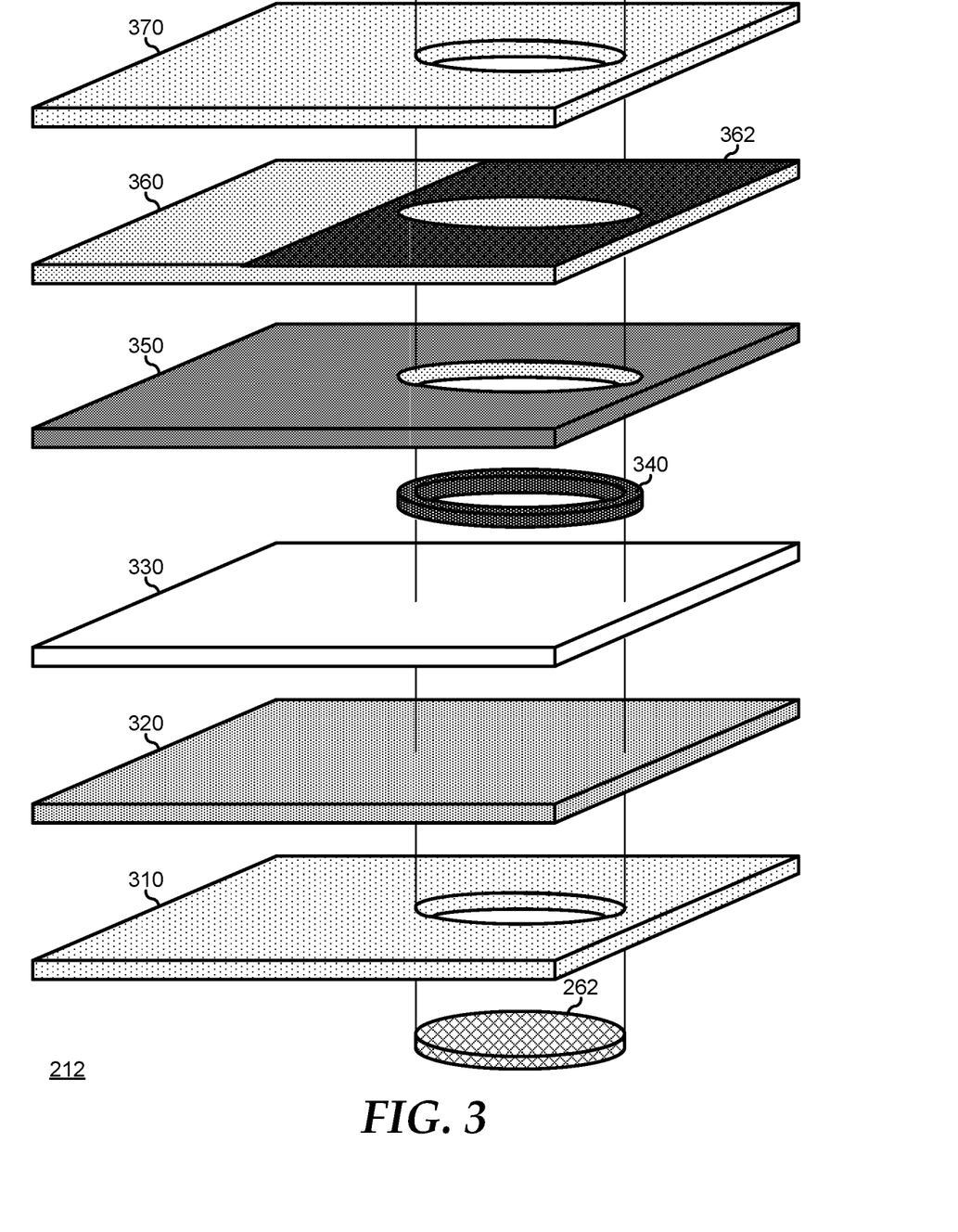
FIG. 3 is a layer diagram of a display panel of the display of FIG. 1.

To accommodate the placement of camera 260 behind display panel 210, the display panel is fabricated with a camera passthrough section 212, as depicted in cut-away portion A-A. FIG. 3 illustrates an exemplary stack-up of section 212, including a back polarizer film 310, a thin-film transistor (TFT) layer 320, an Indium-Tin-Oxide (ITO) layer 330, a color electronic ink reservoir 340, a liquid crystal layer 350, a color filter layer 360 including a partial black matrix layer 362, and a front polarizer film 370. In areas of display panel 210 that are not proximate to camera/video device 260, the layers of the display panel operate in accordance with their typical function, and the functions, the details of which are known in the art, and will not be further described herein, except as needed to illustrate the current embodiments. Moreover, the type of display panel utilized in conjunction with the teachings of the current disclosure are not limited to the illustrated LCD-type display panel, but the teachings herein may be utilized in conjunction with any other type of display panel, as needed or desired. As such, the layers of camera passthrough section 212 provide their typical functions and features as may be associated with a typical LCD-type display panel, except as where clarified or elaborated upon in the current embodiments.

Camera passthrough section 212 is illustrated with camera lens 262 at the bottom, and with parallel lines radiating upward from the edges of the camera lens to illustrate the features of the layers of the camera passthrough section within an aperture that provides a field of view of the camera lens. Back polarizer film 310 is illustrated as extending into camera passthrough section 212, but as not extending into the aperture of camera lens 262, so as to not affect the light image within the field of view. As such, back polarizer film 310 can be fabricated with a hole in the film at a width of at least the width of camera lens 262. TFT layer 320 and ITO layer 330 are typically transparent layers and so are not illustrated as including cut outs. Moreover, as will be described below, TFT layer 320 needs to remain at least partially intact in order to activate color electronic ink reservoir 340. Liquid crystal layer 350 includes a void that is wider than the aperture of camera lens 262, and, color electronic ink reservoir 340 is fabricated into the void in the liquid crystal layer. Color filter layer 360 remains intact except that black matrix layer 362 is fabricated with a hole in the film at a width of at least the width of camera lens 262. Color e-ink layer 340 will be described further below. Front polarizer film 370 is illustrated as extending into camera passthrough section 212, but as not extending into the aperture of camera lens 262, so as to not affect the light image within the field of view. As such, front polarizer film 370 can be fabricated with a hole in the film at a width of at least the width of camera lens 262.

Figure 4:
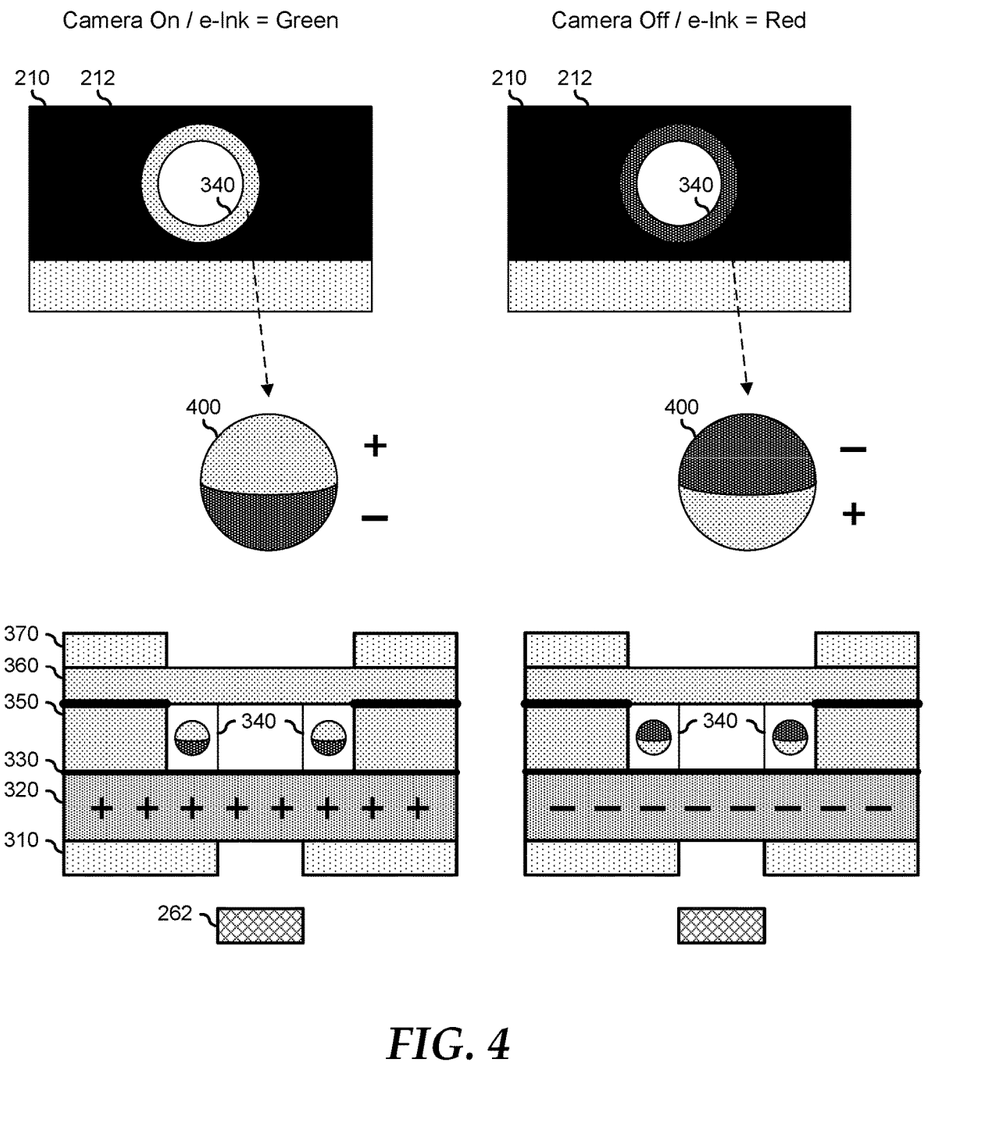
FIG. 4 is a diagram illustrating various states of the display of FIG. 1.

FIG. 4 illustrates the operation of display 200 as related to camera/video device 260 in operating modes including an "on" state and an "off" state. Color electronic ink reservoir 340 is a transparent sealed capsule that is filled with electronic ink particles 400. In the illustrated embodiment, electronic ink particles 400 represent particles that have one half of their surfaces coated with a first color and that have the other half of their surfaces coated with a second color. The first half of the particles is charged with and retains a positive charge and the second half of the particles is charged with and retains a negative charge. Thus, when the portions of TFT layer 320 that underlay color electronic ink reservoir 340 are positively charged, the first half of the particles is repelled from the TFT layer, and the first color becomes visible from the front of display 200. Conversely, when the portions of TFT layer 320 that underlay color electronic ink reservoir 340 are negatively charged, the second half of the particles is repelled from the TFT layer, and the second color becomes visible from the front of display 200. In a particular embodiment, the first color may be green, and the second color may be red.

Display 200 includes control circuitry and logic to turn camera/video device 260 on or off. When camera/video device 260 is turned on, the portions of TFT layer 320 that underlay color electronic ink reservoir 340 are controlled to exhibit a positive charge, and the green surface of electronic ink particles 400 are revealed, providing a green indication of the "on" state of the camera/video device. Conversely, when camera/video device 260 is turned off the portions of TFT layer 320 that underlay color electronic ink reservoir 340 are controlled to exhibit a negative charge, and the red surface of electronic ink particles 400 are revealed, providing a red indication of the "off" state of the camera/video device.

In another embodiment, electronic ink particles 400 represent multiple capsules, each filled with different colored and charged particles. For example, electronic ink particles 400 may include green positively charged particles and red negatively charged particles. When subjected to various charge states of TFT layer 320, the particles within the capsule will migrate in opposite directions to provide the indication functions as described above. In another embodiment, rather than filling color electronic ink reservoir 340 with separate capsules with the different colored and charged particles, the entirety of the color electronic ink reservoir may be filled, substantially half with the first type of particles and substantially half with the second type of particles.

Figure 5:
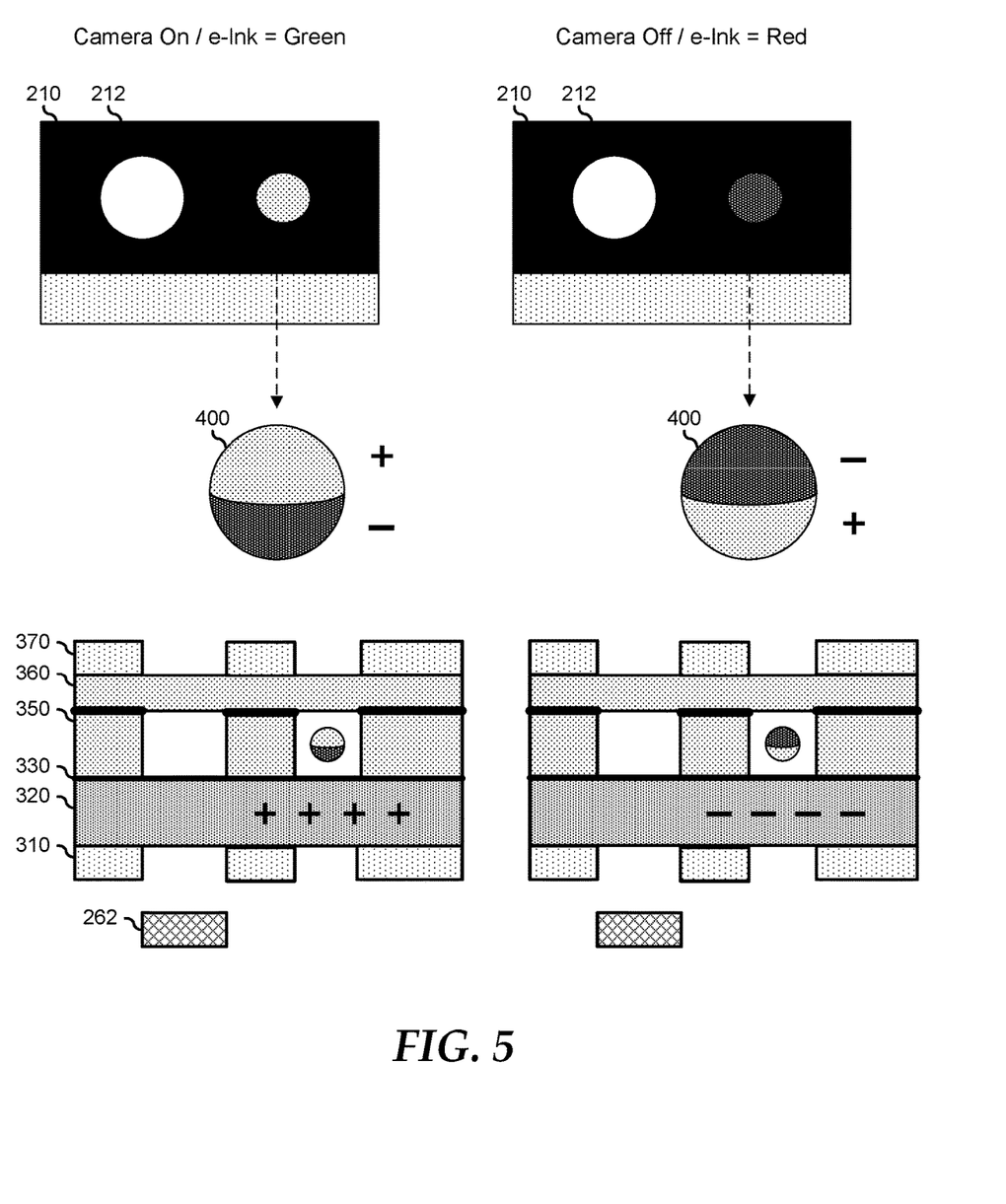
FIG. 5 is a diagram illustrating various states of a display similar to the display of FIG. 1 according to an embodiment of the current disclosure.

Note that, as described herein, an electronic ink reservoir is shown as being proximate to, and closely associated with an aperture of a camera/video device, but this is not necessarily so. FIG. 5 illustrates the operation of a display similar to display 200 as related to camera/video device 260 in operating modes including an "on" state and an "off" state. Color electronic ink reservoir 340 is a transparent sealed capsule that is filled with electronic ink particles 400. Here, color electronic ink capsule 340 is displaced from around the aperture of camera/video device 260, such that the color electronic ink reservoir creates an indication of the "on" or "off" state of the camera/video device that is separated from the aperture. In all other aspects, the operation of the display of FIG. 5 is similar to the operation of display 200 as described above.

Figure 6:
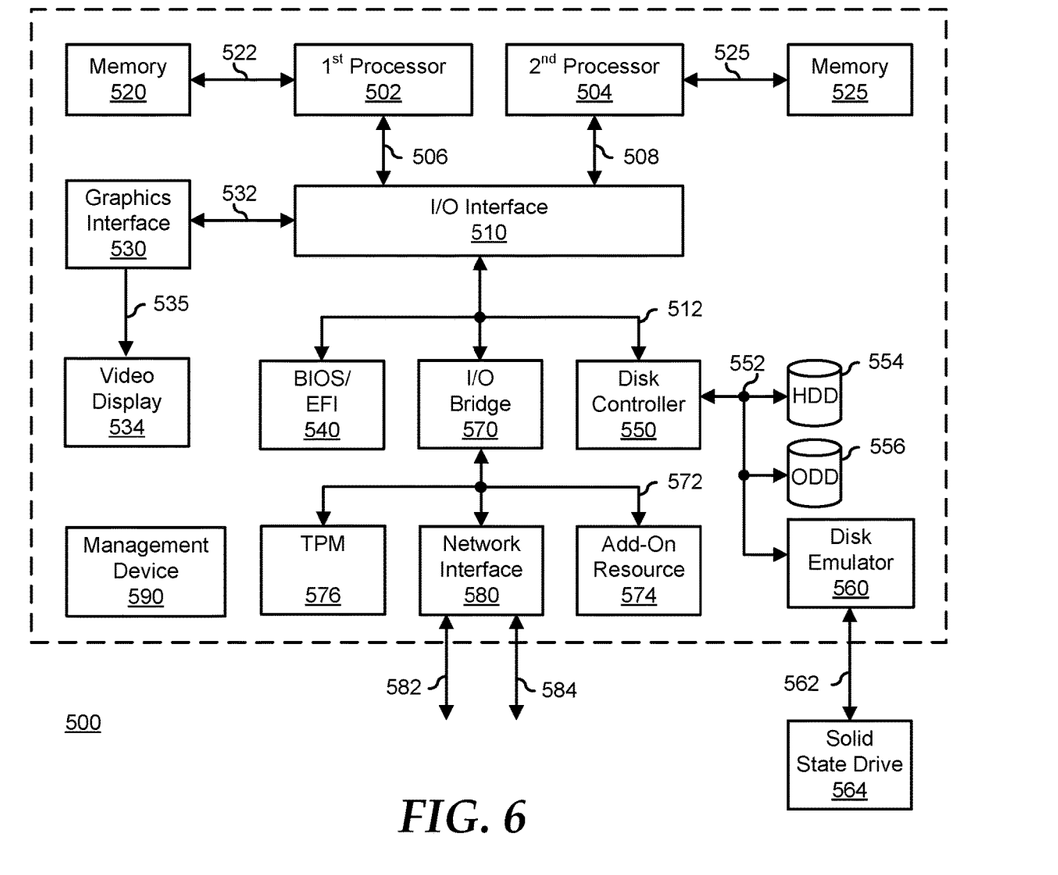
FIG. 6 is a block diagram illustrating a generalized information handling system according to another embodiment of the present disclosure.

FIG. 6 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A liquid crystal display (LCD) panel, comprising:
   a thin-film transistor layer including a first portion to provide an image on the LCD panel, a second portion, and a third portion, wherein the second portion surrounds the third portion;
   an electronic ink reservoir located proximate to the second portion of the thin-film transistor layer and including an electronic ink configured under a first electrical stimulus to present a first color and under a second electrical stimulus to present a second color; and an image capture device positioned behind the thin-film transistor layer and located proximate to the third portion of the thin film transistor layer;

wherein the LCD panel is configured to direct the second portion of the thin-film transistor layer to provide the first electrical stimulus to the electronic ink reservoir in response to the LCD panel being in a first state, and to direct the second portion of the thin-film transistor layer to provide the second electrical stimulus to the electronic ink reservoir in response to the LCD panel being in a second state.

2. The LCD panel of claim 1, wherein the LCD panel provides an aperture for the image capture device, the aperture being located within the third portion of the thin-film transistor layer.

3. The LCD panel of claim 1, wherein the first state includes an on state of the image capture device, and the second state includes an off state of the image capture device.

4. The LCD panel of claim 3, wherein the first color is green and the second color is red.

5. The LCD panel of claim 1, wherein the electronic ink includes particles, each particle having a first surface of the first color and a second surface of the second color.

6. The LCD panel of claim 5, wherein each particle retains a positive charge on the first surface and a negative charge on the second surface.

7. The LCD panel of claim 1, wherein the electronic ink includes a plurality of capsules, each capsule including particles of a first type and particles of a second type, wherein the first type of particles are of the first color and retain a positive charge, and wherein the second type of particles are of the second color and retain a negative charge.

8. The LCD panel of claim 1, wherein the electronic ink reservoir includes particles of a first type and particles of a second type, wherein the first type of particles are of the first color and retain a positive charge, and wherein the second type of particles are of the second color and retain a negative charge.

9. A method, comprising:
providing, on a thin-film transistor layer of a liquid crystal display (LCD) panel, a first portion to provide an image on the LCD panel, a second portion, and a third portion, wherein the second portion surrounds the third portion;
locating, proximate the second portion of the thin-film transistor layer, an electronic ink reservoir, the electronic ink reservoir including an electronic ink configured under a first electrical stimulus to present a first color and under a second electrical stimulus to present a second color;
locating, proximate to the third portion of the thin-film transistor layer, an image capture device, wherein the image capture device is positioned behind the thin-film transistor layer;
directing the second portion of the thin-film transistor layer to provide the first electrical stimulus to the electronic ink reservoir in response to the LCD panel being in a first state; and
directing the second portion of the thin-film transistor layer to provide the second electrical stimulus to the electronic ink reservoir in response to the LCD panel being in a second state.

10. The method of claim 9, further comprising providing, within the third portion of the thin-film transistor layer, an aperture for the image capture device.

11. The method of claim 9, wherein the first state includes an on state of the image capture device, and the second state includes an off state of the image capture device.

12. The method of claim 11, wherein the first color is green and the second color is red.

13. The method of claim 9, wherein the electronic ink includes particles, each particle having a first surface of the first color and a second surface of the second color.

14. The method of claim 13, wherein each particle retains a positive charge on the first surface and a negative charge on the second surface.

15. The method of claim 9, wherein the electronic ink includes a plurality of capsules, each capsule including particles of a first type and particles of a second type, wherein the first type of particles are of the first color and retain a positive charge, and wherein the second type of particles are of the second color and retain a negative charge.

16. A display panel, comprising:
a display panel device including a first portion to provide an image on the display panel, a second portion, and a third portion, wherein the second portion surrounds the third portion;
an electronic ink reservoir located proximate to the second portion of the thin-film transistor layer and including an electronic ink configured under a first electrical stimulus to present a first color and under a second electrical stimulus to present a second color; and
an image capture device positioned behind the thin-film transistor layer and located proximate to the third portion of the thin film transistor layer;
wherein the display panel is configured to direct the second portion of the display panel device to provide the first electrical stimulus to the electronic ink reservoir in response to the display panel being in a first state, and to direct the second portion of the display panel device to provide the second electrical stimulus to the electronic ink reservoir in response to the display panel being in a second state.

* * * * *